(12) United States Patent
Lei et al.

(10) Patent No.: US 12,232,124 B2
(45) Date of Patent: Feb. 18, 2025

(54) MULTI-SLOT SCHEDULING ON UNLICENSED SPECTRUM

(71) Applicant: LENOVO (BEIJING) LIMITED, Beijing (CN)

(72) Inventors: Haipeng Lei, Beijing (CN); Alexander Johann Maria Golitschek Edler von Elbwart, Darmstadt (DE)

(73) Assignee: Lenovo (Beijing) Limited, Beijing (CN)

( * ) Notice: Subject to any disclaimer, the term of this patent is extended or adjusted under 35 U.S.C. 154(b) by 701 days.

(21) Appl. No.: 17/276,129

(22) PCT Filed: Sep. 28, 2018

(86) PCT No.: PCT/CN2018/108282
§ 371 (c)(1),
(2) Date: Mar. 13, 2021

(87) PCT Pub. No.: WO2020/062011
PCT Pub. Date: Apr. 2, 2020

(65) Prior Publication Data
US 2022/0053541 A1 Feb. 17, 2022

(51) Int. Cl.
*H04W 72/12* (2023.01)
*H04W 72/23* (2023.01)
(Continued)

(52) U.S. Cl.
CPC ....... *H04W 72/23* (2023.01); *H04W 74/0808* (2013.01)

(58) Field of Classification Search
CPC ............. H04W 72/23; H04W 74/0808; H04W 72/0446
(Continued)

(56) References Cited

U.S. PATENT DOCUMENTS 11,012,999 B2* 5/2021 Huang ................ H04L 5/0053
2018/0206226 A1* 7/2018 Zeng ..................... H04L 5/0053
(Continued)

FOREIGN PATENT DOCUMENTS

CN 102404074 A 4/2012
WO 2017167304 A1 10/2017
(Continued)

OTHER PUBLICATIONS

International Searching Authority, "Notification of Transmittal of the International Search Report and the Written Opinion of the International Searching Authority, or the Declaration", PCT/CN2018/108282, Sep. 28, 2018, pp. 1-6.
(Continued)

*Primary Examiner* — Candal Elpenord
(74) *Attorney, Agent, or Firm* — Kunzler Bean & Adamson (57) ABSTRACT

Methods and apparatuses for multi-slot scheduling on unlicensed spectrum are disclosed. A method comprises: receiving a downlink control information (DCI) for scheduling time-contiguous data transmission in multiple slots, wherein the DCI includes an indicator indicating the time domain resource allocation in the multiple slots; determining, based on the indicator, a starting position and an ending position of the scheduled time-contiguous data transmission; and transmitting, in response to a successful listen-before-talk (LBT), data from the determined starting position to the determined ending position.

20 Claims, 5 Drawing Sheets

(51) Int. Cl.
*H04W 74/08* (2024.01)
*H04W 74/0808* (2024.01)

(58) Field of Classification Search
USPC .................................... 370/329–330, 336
See application file for complete search history.

(56) References Cited

U.S. PATENT DOCUMENTS

| | | | |
|---|---|---|---|
| 2019/0082431 A1* | 3/2019 | Yi ..................... | H04W 72/0446 |
| 2020/0045696 A1* | 2/2020 | Huang ................. | H04L 5/10 |
| 2020/0287691 A1* | 9/2020 | Baldemair ........... | H04L 5/0055 |
| 2021/0144757 A1* | 5/2021 | Fazili ................. | H04W 16/14 |
| 2021/0168849 A1* | 6/2021 | Oh ..................... | H04L 5/0053 |
| 2021/0314983 A1* | 10/2021 | Karaki ................ | H04W 72/23 |
| 2023/0309105 A1* | 9/2023 | Yi ..................... | H04W 72/0446 |

FOREIGN PATENT DOCUMENTS

| | | |
|---|---|---|
| WO | 2017194005 A1 | 11/2017 |
| WO | 2020030555 A1 | 8/2019 |

OTHER PUBLICATIONS

3GPP, 3rd Generation Partnership Project; Technical Specification Group Radio Access Network; Physical layer procedures for data 3GPP TS 38.214 Jun. 2018, pp. 1-95.

Ericsson, HARQ enhancements for NR-U, 3GPP TSG-RAN WG1 Meeting #94, R1-1809206, Aug. 20-24, 2018, pp. 1-7, Gothenburg, Sweden.

Lenovo, Motorola Mobility, Frame structure for NR-U operation, 3GPP TSG RAN WG1 Meeting #94, R1-1808543, Aug. 20-24, 2018, pp. 1-3, Gothenburg, Sweden.

Ericsson, On Frame Structure for NR in Unlicensed Spectrum, 3GPP TSG RAN WG1 Meeting #92bis, R1-1805009, Apr. 16-20, 2018, pp. 1-4, Sanya, China.

* cited by examiner

MULTI-SLOT SCHEDULING ON UNLICENSED SPECTRUM

FIELD

The subject matter disclosed herein generally relates to wireless communications and, more particularly, to multi-slot scheduling on unlicensed spectrum.

BACKGROUND

The following abbreviations are herewith defined, some of which are referred to within the following description:

Third Generation Partnership Project (3GPP), European Telecommunications Standards Institute (ETSI), Frequency Division Duplex (FDD), Frequency Division Multiple Access (FDMA), Long Term Evolution (LTE), New Radio (NR), Very Large Scale Integration (VLSI), Random Access Memory (RAM), Read-Only Memory (ROM), Erasable Programmable Read-Only Memory (EPROM or Flash Memory), Compact Disc Read-Only Memory (CD-ROM), Local Area Network (LAN), Wide Area Network (WAN), Personal Digital Assistant (PDA), User Equipment (UE), Uplink (UL), Evolved Node B (eNB), Next Generation Node B (gNB), Downlink (DL), Central Processing Unit (CPU), Graphics Processing Unit (GPU), Field Programmable Gate Array (FPGA), Dynamic RAM (DRAM), Synchronous Dynamic RAM (SDRAM), Static RAM (SRAM), Liquid Crystal Display (LCD), Light Emitting Diode (LED), Organic LED (OLED), Multiple-Input Multiple-Output (MIMO), Physical Uplink Shared Channel (PUSCH), Physical Downlink Shared Channel (PDSCH), Sounding Reference Signal (SRS), Time division multiplexing (TDM), Code division multiplexing (CDM), Orthogonal Cover Code (OCC), Cycling Shift (CS), Physical Resource Block (PRB), Hybrid Automatic Repeat Request-Acknowledge (HARQ-ACK), Media Access Control-Control Element (MAC-CE). Listen Before Talk (LBT), Maximum Channel Occupancy Time (MCOT), Radio Resource Control (RRC), cyclic prefix (CP), downlink control indicator (DCI), NR-access on unlicensed spectrum (NR-U).

For transmission on unlicensed spectrum, in order to achieve fair coexistence with other wireless systems, LBT (listen before talk) is required before the transmission on unlicensed spectrum. By means of performing energy detection on a certain channel, if the received power is below a predefined threshold, then the LBT is successful, which means the channel is deemed as empty and available for transmission. Only when the LBT is successful, an equipment can start the transmission on the channel and occupy the channel up to a maximum channel occupancy time (MCOT); otherwise, the equipment can't start the transmission and continue to performing LBT until a successful LBT.

3GPP 5G new radio (NR) can support both slot-based transmission and mini-slot based transmission. In the slot-based transmission, a starting position and an ending position for a transmission are bound to slot boundaries. In the mini-slot based transmission, multiple flexible starting symbols and ending symbols for PDSCH transmission and PUSCH transmission are defined in TS38.214. The corresponding starting symbol and duration for PUSCH type A and B are listed in below table 1. In table 1, "S" represents a starting symbol; "L" represents a duration of symbols in a transmission.

TABLE 1

| PUSCH mapping type | Valid S and L combinations | | | | | |
|---|---|---|---|---|---|---|
| | Normal cyclic prefix | | | Extended cyclic prefix | | |
| | S | L | S + L | S | L | S + L |
| Type A | 0 | {4, ..., 14} | {4, ..., 14} | 0 | {4, ..., 12} | {4, ..., 12} |
| Type B | {0, ..., 13} | {1, ..., 14} | {1, ..., 14} | {0, ..., 12} | {1, ..., 12} | {1, ..., 12} |

Based on the starting symbols and durations defined for normal CP (cyclic prefix), PUSCH type A has only one starting symbol and up to 11 ending symbols; PUSCH type B has up to 14 candidate starting symbols and 14 candidate ending symbols. The detailed values are listed in Table 2. It is noted that the maximum ending symbols is symbol 13 so that one PUSCH transmission is guaranteed not across slot boundary.

TABLE 2

| | Candidate starting symbols and ending symbols for normal CP | |
|---|---|---|
| | Starting symbols (start of symbol #) | Ending symbols (end of symbol #) |
| PUSCH Type A | {0} | {3, 4, ..., 13} |
| PUSCH Type B | {0, 1, ..., 13} | {0, 1, ..., 13} |

NR-U (NR-access on unlicensed spectrum) supports scheduling multiple slots for PUSCH by a single UL grant, i.e. a single DCI format 0_1.

Figure 4:
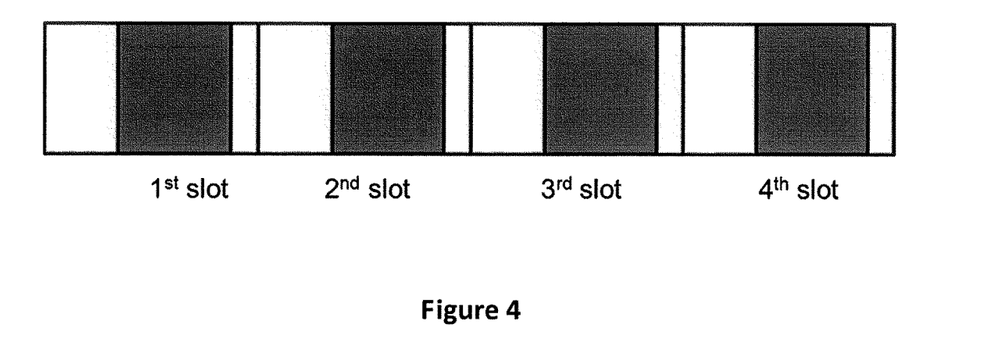
FIG. 4 illustrate a time domain resource assignment for multiple slots scheduled by a single UL grant, in which each slot is a partial scheduled slot.

The DCI format 0_1 includes, among other fields, a field of time domain resource assignment. The field of time domain resource assignment may be set to "common" for all of the scheduled multiple slots. For example, as shown in FIG. 4, assuming four slots are scheduled by a single UL grant, when the time domain resource assignment in the UL grant indicates the row index 6 of Table 3, then the starting symbol and ending symbol are symbol 4 and symbol 11 (calculated by 4+8−1). If the field of time domain resource assignment is set to common for the four scheduled slots, then the starting symbol and ending symbol for all of the first to fourth slots are 4 and 11, respectively. Thus, transmission gaps are formed between the first slot and the second slot, between the second slot and the third slot, and between the third slot and the fourth slot. Therefore, non-contiguous time domain resource allocation is caused. This non-contiguous time domain resource allocation is not suitable for burst based transmission on unlicensed spectrum because LBT is needed for each of the multiple scheduled slots. That means that any transmission gap bears the risk of 'losing' the channel to another node that sensed the channel to be idle in such a gap and henceforth starts its own transmission.

Figure 5:
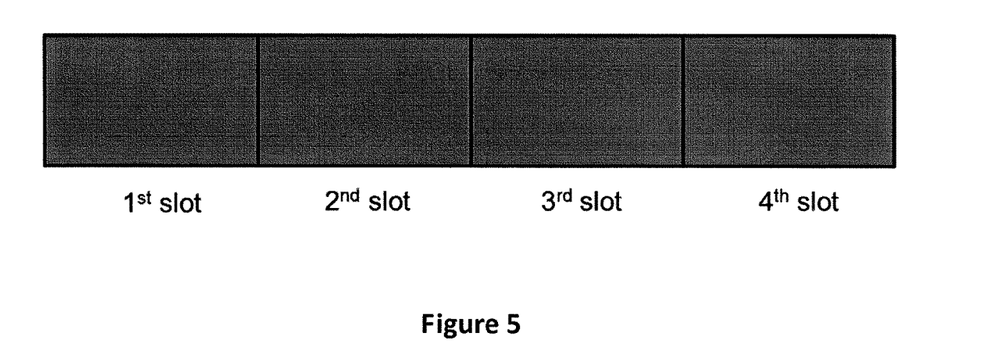
FIG. 5 illustrate a time domain resource assignment for multiple slots scheduled by a single UL grant, in which each slot is a full scheduled slot.

In order to form time-contiguous domain resource allocation without transmission gaps, a multiple full slot scheduling may be used as shown in FIG. 5. However, the scheduling flexibility is restricted since the multiple scheduled slots have to start from the symbol 0.

TABLE 3

Default PUSCH time domain resource allocation

| Row index | PUSCH mapping type | $K_2$ | S | L |
|---|---|---|---|---|
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 4

Definition of value j

| $\mu_{PUSCH}$ | j |
|---|---|
| 0 | 1 |
| 1 | 1 |
| 2 | 2 |
| 3 | 3 |

In the above tables 3 and 4, S represents the starting position, L represents the duration, K2 represents slot level offset between the slot where UL grant is received and the slot where associated PUSCH is scheduled. $\mu_{PUSCH}$ is the subcarrier spacing. Different subcarrier spacing values correspond to different values of K2. So, j is used to indicate such difference.

BRIEF SUMMARY

Methods and apparatuses for multi-slot scheduling on unlicensed spectrum are disclosed. Several solutions are proposed to support time-contiguous domain resource allocation for multiple slots scheduled by a single UL grant for uplink transmission on unlicensed spectrum. The same principle may apply to downlink transmission.

In one embodiment, a method comprises: receiving a downlink control information (DCI) for scheduling time-contiguous data transmission in multiple slots, wherein the DCI includes an indicator indicating the time domain resource allocation in the multiple slots; determining, based on the indicator, a starting position and an ending position of the scheduled time-contiguous data transmission; and transmitting, in response to a successful listen-before-talk (LBT), data from the determined starting position to the determined ending position.

In some embodiment, the indicator may indicate a starting symbol in a first slot of the multiple slots. Preferably, the starting symbol in the first slot may be chosen from a set of possible starting symbols configured by Radio Resource Control (RRC) signaling. Alternatively, the starting symbol in the first slot may be chosen from a set of possible starting symbols of Physical Uplink Shared Channel (PUSCH) mapping type B. In some embodiment, a starting symbol in a first slot of the multiple slots is fixed to symbol 0. In addition, the indicator may further indicate a duration of the scheduled symbols in the multiple slots.

In some embodiment, the indicator may indicate an ending symbol of a last slot of the multiple slots. Preferably, the ending symbol of the last slot may be chosen from a set of possible ending symbols configured by Radio Resource Control (RRC) signaling. Alternatively, the ending symbol of the last slot may be chosen from a set of possible ending symbols of Physical Uplink Shared Channel (PUSCH) mapping type B.

In some embodiment, the indicator may indicate the number of the multiple slots. In other embodiment, the indicator may indicate the number of full slots. In a further embodiment, the indicator may indicate a starting symbol index in a first slot of the multiple slots and a difference between the starting symbol index and an ending symbol index of a last slot of the multiple slots.

In some embodiment, the indicator may indicate a starting symbol index in a first slot of the multiple slots and a duration in a number of symbols in a last slot of the multiple slots. In some embodiment, the indicator may include separate indications of PUSCH mapping types for a first slot, a last slot and middle slot(s) of the multiple slots. In a further embodiment, the PUSCH mapping types for the first slot, the last slot and the middle slot(s) of the multiple slots may be implicitly determined.

In another embodiment, a method comprises: transmitting a downlink control information (DCI) to a remote unit for scheduling time-contiguous data transmission in multiple slots, wherein the DCI includes an indicator indicating time domain resource allocation in the multiple slots; and receiving, from the remote unit subjected to a successful listen-before-talk (LBT), data from a starting position to an ending position determined from the indicated time domain resource allocation in the multiple slots.

In yet another embodiment, an apparatus comprises: a receiver that receives a downlink control information (DCI) for scheduling time-contiguous data transmission in multiple slots, wherein the DCI includes an indicator indicating the time domain resource allocation in the multiple slots; a processor that, based on the indicator, determines a starting position and an ending position of the scheduled time-contiguous data transmission; and a transmitter that, in response to a successful listen-before-talk (LBT), transmits data from the determined starting position to the determined ending position.

In further embodiment, an apparatus comprises: a transmitter that transmits a downlink control information (DCI) to a remote unit for scheduling time-contiguous data transmission in multiple slots, wherein the DCI includes an indicator indicating time domain resource allocation in the multiple slots; and a receiver that receives, from the remote unit subjected to a successful listen-before-talk (LBT), data from a starting position to an ending position determined from the indicated time domain resource allocation in the multiple slots.

BRIEF DESCRIPTION OF THE DRAWINGS

A more particular description of the embodiments briefly described above will be rendered by reference to specific embodiments that are illustrated in the appended drawings. Understanding that these drawings depict only some embodiments, and are not therefore to be considered as limiting of scope, the embodiments will be described and explained with additional specificity and detail using accompanying drawings, in which.

DETAILED DESCRIPTION

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may generally all be referred to herein as a "circuit", "module" or "system". Furthermore, embodiments may take the form of a program product embodied in one or more computer readable storage devices storing machine-readable code, computer readable code, and/or program code, referred to hereafter as "code". The storage devices may be tangible, non-transitory, and/or non-transmission. The storage devices may not embody signals. In a certain embodiment, the storage devices only employ signals for accessing code.

Certain functional units described in this specification may be labeled as "modules", in order to more particularly emphasize their independent implementation. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but, may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. This operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing code. The storage device may be, for example, but need not necessarily be, an electronic, magnetic, optical, electromagnetic, infrared, holographic, micromechanical, or semiconductor system, apparatus, or device, or any suitable combination of the foregoing.

A non-exhaustive list of more specific examples of the storage device would include the following: an electrical connection having one or more wires, a portable computer diskette, a hard disk, random access memory (RAM), read-only memory (ROM), erasable programmable read-only memory (EPROM or Flash Memory), portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Code for carrying out operations for embodiments may be any number of lines and may be written in any combination of one or more programming languages including an object-oriented programming language such as Python, Ruby, Java, Smalltalk, C++, or the like, and conventional procedural programming languages, such as the "C" programming language, or the like, and/or machine languages such as assembly languages. The code may be executed entirely on the user's computer, partly on the user's computer, as a stand-alone software package, partly on the user's computer and partly on a remote computer or entirely on the remote computer or server. In the very last scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment", "an embodiment", or similar language means that a particular feature, structure, or characteristic described in connection with the embodiment is included in at least one embodiment. Thus, appearances of the phrases "in one embodiment", "in an embodiment", and similar language throughout this specification may, but do not necessarily, all refer to the same embodiment, but mean "one or more but not all embodiments" unless expressly specified otherwise. The terms "including", "comprising", "having", and variations thereof mean "including but are not limited to", unless otherwise expressly specified. An enumerated listing of items does not imply that any or all of the items are mutually exclusive, otherwise unless expressly specified. The terms "a", "an", and "the" also refer to "one or more" unless otherwise expressly specified.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid any obscuring of aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general purpose computer, special purpose computer, or other programmable data processing apparatus to produce a machine, such that the instructions, which are executed via the processor of the computer or other programmable data processing apparatus, create means for implementing the functions specified in the schematic flowchart diagrams and/or schematic block diagrams for the block or blocks.

The code may also be stored in a storage device that can direct a computer, other programmable data processing apparatus, or other devices, to function in a particular manner, such that the instructions stored in the storage device produce an article of manufacture including instructions which implement the function specified in the schematic flowchart diagrams and/or schematic block diagrams block or blocks.

The code may also be loaded onto a computer, other programmable data processing apparatus, or other devices, to cause a series of operational steps to be performed on the computer, other programmable apparatus or other devices to produce a computer implemented process such that the code executed on the computer or other programmable apparatus provides processes for implementing the functions specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that in some alternative implementations, the functions noted in the block may occur out of the order noted in the Figures. For example, two blocks shown in succession may substantially be executed concurrently, or the blocks may sometimes be executed in the reverse order, depending upon the functionality involved. Other steps and methods may be conceived that are equivalent in function, logic, or effect to one or more blocks, or portions thereof, to the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

Figure 1:
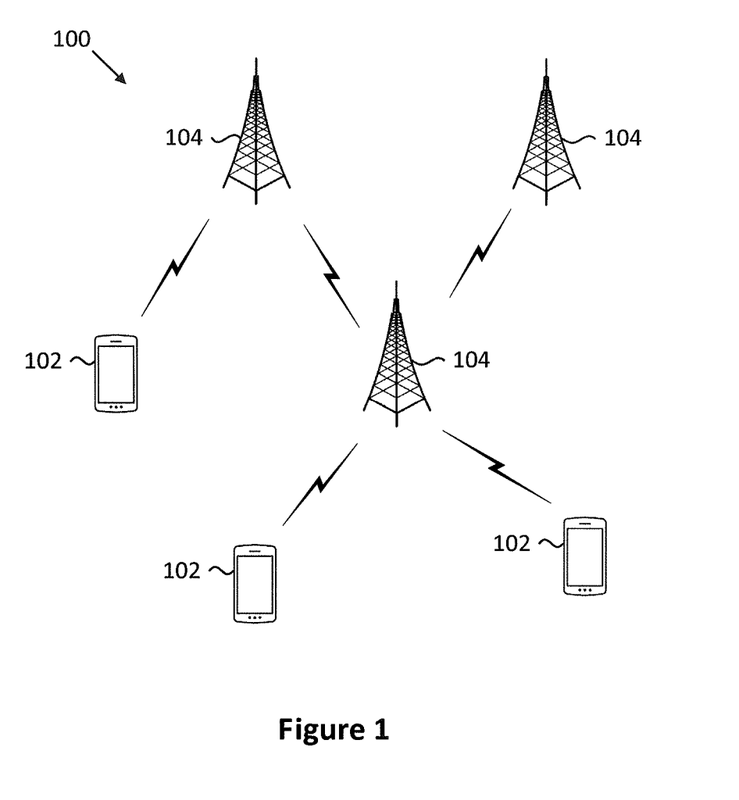
FIG. 1 is a schematic block diagram illustrating one embodiment of a wireless communication system.

FIG. 1 depicts an embodiment of a wireless communication system 100 for multi-slot scheduling on unlicensed spectrum. In one embodiment, the wireless communication system 100 includes remote units 102 and base units 104. Even though a specific number of remote units 102 and base units 104 are depicted in FIG. 1, one skilled in the art will recognize that any number of remote units 102 and base units 104 may be included in the wireless communication system 100.

In one embodiment, the remote units 102 may include computing devices, such as desktop computers, laptop computers, personal digital assistants (PDAs), tablet computers, smart phones, smart televisions (e.g., televisions connected to the Internet), set-top boxes, game consoles, security systems (including security cameras), vehicle on-board computers, network devices (e.g., routers, switches, modems), or the like. In some embodiments, the remote units 102 include wearable devices, such as smart watches, fitness bands, optical head-mounted displays, or the like. The remote units 102 may be referred to as subscriber units, mobiles, mobile stations, users, terminals, mobile terminals, fixed terminals, subscriber stations, user equipment (UE), user terminals, a device, or by other terminology used in the art.

The remote units 102 may communicate directly with one or more of the base units 104 via UL communication signals.

The base units 104 may be distributed over a geographic region. In certain embodiments, a base unit 104 may also be referred to as an access point, an access terminal, a base, a base station, a Node-B, an eNB, a gNB, a Home Node-B, a relay node, a device, or by any other terminology used in the art. The base units 104 are generally part of a radio access network that includes one or more controllers communicably coupled to one or more corresponding base units 104. The radio access network is generally communicably coupled to one or more core networks, which may be coupled to other networks, like the Internet and public switched telephone networks, among other networks. These and other elements of radio access and core networks are not illustrated, but are well known generally by those having ordinary skill in the art.

In one implementation, the wireless communication system 100 is compliant with 3GPP 5G new radio (NR). More generally, however, the wireless communication system 100 may implement some other open or proprietary communication protocol.

The base units 104 may serve a number of remote units 102 within a serving area, for example, a cell (or a cell sector) or more cells via a wireless communication link. The base units 104 transmit DL communication signals to serve the remote units 102 in the time, frequency, and/or spatial domain.

Figure 2:
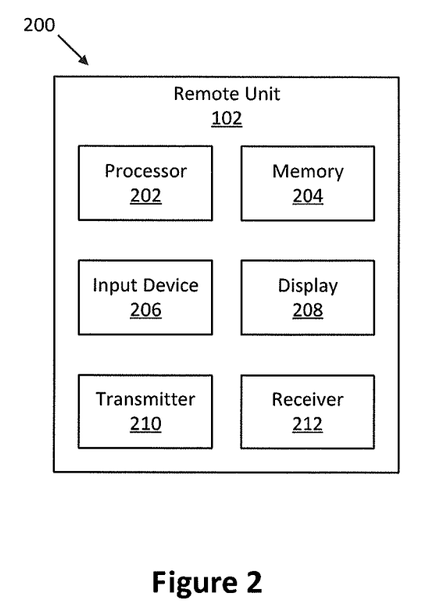
FIG. 2 is a schematic block diagram illustrating one embodiment of an apparatus that may be used for multi-slot scheduling on unlicensed spectrum.

FIG. 2 depicts one embodiment of an apparatus 200 that may be used for multi-slot scheduling on unlicensed spectrum. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touch screen. In certain embodiments, the remote unit 102 may not include any input device 206 and/or display 208. In various embodiments, the remote unit 102 may include at least one of the processor 202, the memory 204, the transmitter 210 and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit (CPU), a graphics processing unit (GPU), an auxiliary processing unit, a field programmable gate array (FPGA), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM (DRAM), synchronous dynamic RAM (SDRAM), and/or static RAM (SRAM). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 stores data relating to system parameters. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touch screen or similar touch-sensitive display. In some embodiments, the input device 206 includes a touch screen such that text may be input using a virtual keyboard displayed on the touch screen and/or by handwriting on the touch screen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, an LCD display, an LED display, an OLED display, a projector, or similar display device capable of outputting images, text, or the like to a user. As another, non-limiting example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touch screen or similar touch-sensitive display. In other embodiments, the display 208 may be located near the input device 206.

The transmitter 210 is used to provide UL communication signals to the base unit 104 and the receiver 212 is used to receive DL communication signals from the base unit 104. In various embodiments, the transmitter 210 and the receiver 212 may transmit and receive resources via different cells. Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
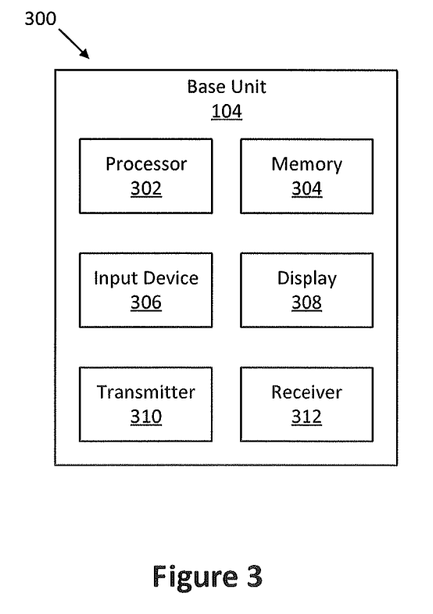
FIG. 3 is a schematic block diagram illustrating one embodiment of another apparatus that may be used for multi-slot scheduling on unlicensed spectrum.

FIG. 3 depicts one embodiment of another apparatus 300 that may be used for multi-slot scheduling on unlicensed spectrum. The apparatus 300 includes one embodiment of the base unit 104. Furthermore, the base unit 104 may include at least one of a processor 302, a memory 304, an input device 306, a display 308, a transmitter 310 and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

Although only one transmitter 310 and one receiver 312 are illustrated, the base unit 104 may have any suitable number of transmitters 310 and receivers 312. The transmitter 310 and the receiver 312 may be any suitable type of transmitters and receivers. In one embodiment, the transmitter 310 and the receiver 312 may be part of a transceiver.

Figure 6:
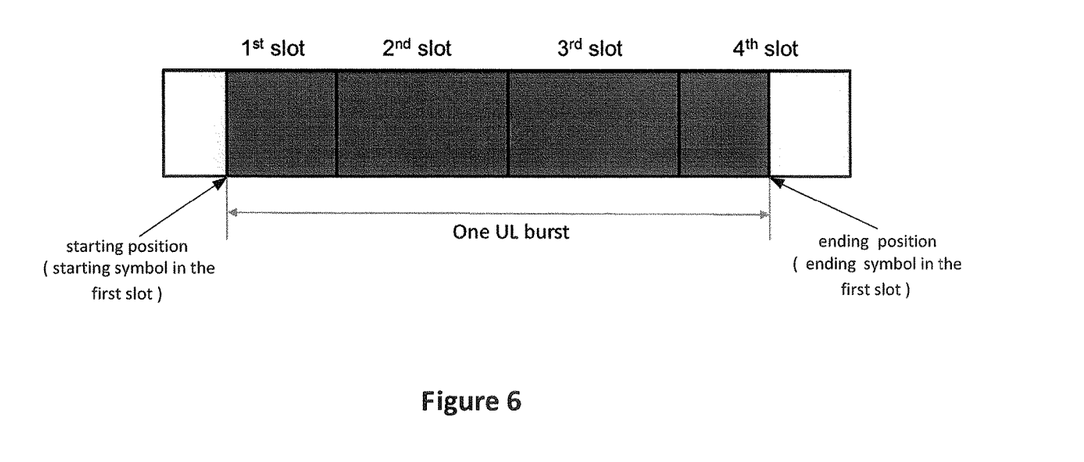
FIG. 6 illustrates a time-contiguous domain resource allocation for multiple slots scheduled by a single UL grant.

FIG. 6 illustrate a schematic view of a time-contiguous domain resource allocation for multiple slots scheduled by a single UL grant. As shown in FIG. 6, the time-contiguous domain resource allocation for multiple UL slots is labeled as one UL burst. The time-contiguous domain resource may start from any symbol in the first slot, and end at any symbol in the last slot. The multiple slots scheduled by a single UL grant may be any integer, and preferably be 2 or more. FIG. 6 shows that the total scheduled slots are four. The slots between the first slot and the last slot are referred to as the middle slots. In FIG. 6, the second slot and the third slot are middle slots. The number of middle slots equals the total scheduled slots minus 2. Therefore, in the situation that the total scheduled slots are 2 slots, the number of middle slots is zero. To satisfy the time-contiguous domain resource allocation, all of the symbols (Symbol 0 to Symbol 13) in each of the middle slots have to be fully scheduled.

Both the existing PUSCH mapping type A and type B may be used to indicate time domain resource allocation for a single slot. According to a first embodiment, described below in connection with FIG. 6, a new PUSCH mapping type C is introduced to indicate time domain resource allocation for multiple slots.

As the time domain resource is contiguous across the multiple slots, it is only necessary to indicate a starting position and an ending position of the allocated resource. The starting position refers to a starting symbol in the first slot. Since the starting position is always in the first slot (in other words, the index of the first slot is always 1), it is enough to determine the starting position according to the starting symbol. The ending position refers to an ending symbol in the last slot. The ending position is determined according to an index of the last slot and the ending symbol in the last slot. The index of the last slot may be calculated based on the number of scheduled slots. In particular, the index of the last slot equals the number of scheduled slots. In the example of FIG. 6, the index of the last slot is 4.

In the first embodiment, there is a number of alternative implementation to determine the starting position and the ending position of the allocated resource.

In a first alternative implementation of the first embodiment, a starting symbol in the first slot, an ending symbol in the last slot and the number of total scheduled slots are used for indicating the starting position and the ending position of the allocated resource.

The starting symbol in the first slot is selected from a set of starting symbols. The ending symbol in the last slot is selected from a set of ending symbols. In the first alternative implementation of the first embodiment, the set of starting symbols and the set of ending symbols are configured by RRC signaling. The number of total scheduled slots is a number that is no more than the maximum number of slots scheduled by a single UL grant. The maximum number of slots scheduled by a single UL grant may be configured by RRC signaling.

Upon receiving an indication of a starting symbol in the first slot, the indication of the ending symbol in the last slot, as well as the total number of scheduled slots as part of the received UL grant, UE knows the time domain resource allocation for the multiple slots, i.e. the starting position and the ending position of the allocated resource.

In a second alternative implementation of the first embodiment, similar to the first alternative implementation, a starting symbol in the first slot, an ending symbol in the last slot and the total number of scheduled slots are used for indicating the starting position and the ending position of the allocated resource; and the starting symbol in the first slot and the ending symbol in the last slot are selected, respectively from a set of starting symbols and a set of ending symbols.

The second alternative implementation differs from the first alternative implementation in that the starting symbols and ending symbols for PUSCH mapping type B shown in Table 2 are chosen as a set of starting symbols and a set of ending symbols. In this way, the RRC signaling for configuring the set of starting symbols and the set of ending symbols is not needed.

For the first and second alternative implementations of the first embodiment, the field size of time domain resource allocation in the single UL grant depends on the following three factors: (1) the number of possible starting symbols; (2) the number of possible ending symbols; and (3) the maximum number of slots scheduled by a single UL grant. The three factors may be separately indicated in the UL grant and each factor needs ceil(log$_2$(the number of possible values)) bits. Alternatively, the three factors may be jointly coded in the UL grant, so that the field size is dependent on the number of possible combinations.

In a third alternative implementation of the first embodiment, a starting symbol in a first slot and a duration of the total number of scheduled symbols (i.e. the number of total scheduled symbols) are used for indicating a starting position and an ending position of the allocated resource.

The starting symbol in the first slot is selected from a set of starting symbols. In the third alternative implementation of the first embodiment, a set of starting symbols is configured by RRC signaling. The duration of the total number of scheduled symbols is dependent on the maximum number of slots scheduled by the single UL grant, which may be configured by RRC signaling.

Upon receiving an identification of the starting symbol in the first slot and the duration of the total scheduled symbols contained in the UL grant, the UE knows the time domain resource allocation for the multiple slots, i.e. the starting position and the ending position of the allocated resource. In particular, the starting position is the starting symbol in the first slot. The ending position can be calculated from the starting symbol in the first slot and the duration of the total scheduled symbols contained in the UL grant. For example, suppose the starting symbol is x and the duration of the total scheduled symbols is z, the index of the last scheduled slot (which equals the number of total scheduled slots) is N=ceil((x+z)/14) and the ending symbol in the last slot is y=x+z−(N−1)*14−1. As an example, if the starting symbol is 4 and the duration of the total scheduled symbols is 50, then the number of the last scheduled slot is N=ceil((4+50)/14)=4, and the last symbol in the last slot is y=4+50−(4−1)*14−1=11.

In the third alternative implementation of the first embodiment, the field size of time domain resource assignment in the single UL grant depends on the following two factors: (1) the number of possible starting symbols; and (2) the number of bits for indicating a possible duration of symbols. The number of bits for indicating the number of possible starting symbols equals to ceil(log$_2$(the number of possible starting symbols)). The number of bits for indicating the duration of symbols equals ceil(log$_2$(the maximum number of symbols)). For example, assuming maximum 4 slots can be scheduled by single UL grant, then the maximum number of symbols is 56 so that 6 bits in the UL grant are required to indicate the duration.

A fourth alternative implementation of the first embodiment is similar to the third alternative implementation of the first embodiment. The only difference of the fourth alternative implementation from the third alternative implementation lies in that the starting symbols for PUSCH mapping type B shown in Table 2 are chosen as the set of starting symbols. In this way, the RRC signaling for configuring the set of starting positions is not needed.

In a fifth alternative implementation of the first embodiment, symbol 0 is always used as the starting symbol in the first slot. The ending symbol in the last slot is selected from a set of ending symbols. In the fifth alternative implementation of the first embodiment, the set of ending symbols is configured by RRC signaling. The number of total scheduled slots, that is no more than the maximum number of slots scheduled by a single UL grant, is also indicated in the fifth alternative implementation. The maximum number of slots scheduled by a single UL grant may be configured by RRC signaling.

Upon receiving the starting symbol in the first slot which is always symbol 0, the ending symbol in the last slot and the number of total scheduled slots contained in the UL grant, the UE knows the time domain resource allocation for the multiple slots.

The field size representing the number of total scheduled slots equals to ceil(log$_2$(the maximum number of slots)). For example, assuming a maximum of 4 slots can be scheduled by a single UL grant, then 2 bits in the UL grant are required to indicate the duration.

A sixth alternative implementation of the first embodiment is similar to the fifth alternative implementation of the first embodiment. The only difference of the sixth alternative implementation from the fifth alternative implementation lies in that the ending symbols for PUSCH mapping type B show in Table 2 are chosen as the set of ending symbols. In this way, the RRC signaling for configuring the set of symbols is not needed.

A seventh alternative implementation of the first embodiment is similar to the third alternative implementation of the first embodiment. The only difference of the seventh alternative implementation from the third alternative implementation lies in that, instead of choosing a starting symbol from a set of possible starting symbols, symbol 0 is always used as the starting symbol in the first slot.

Upon receiving the time domain resource allocation contained in the UL grant, UE knows the number of total scheduled symbols for the multiple slots. For example, suppose the duration of the total scheduled symbols is z, the index of the last scheduled slot (which equals the number of total scheduled slots) is N=ceil(z/14) and the ending symbol in the last slot is y=z−(N−1)*14−1.

The number of bits required for indicating the number of total scheduled symbols equals ceil(log$_2$(the maximum number of symbols)). For example, assuming a maximum of 4 slots (e.g. 56 symbols) can be scheduled by a single UL grant ceil(log$_2$(the maximum number of symbols))=6 bits in the UL grant are required to indicate the duration of scheduled symbols.

In an eight alternative implementation of the first embodiment, symbol 0 is always used as the starting symbol in the first slot. The ending symbol index in the last slot is directly indicated in the UL grant. The possible ending symbol may be any of 0 to 13.

In the above first to sixth alternative implementations, the starting symbol and the ending symbol are selected from a set configured by RRC signaling or a set predetermined for PUSCH mapping type B. The ending symbol indication contained in the UL grant may be an index to the set. For example, an ending symbol indication of "0000" means that the first value contained in the set is indicated. For example, if the set of the ending symbols are {1, 2, 4, 5, . . . }, the ending symbol indication of "0000" means that ending symbol is 1 (the first value contained in the set). On the other hand, in the eighth alternative implementation, the ending symbol indication is the ending symbol value itself. For example, if the ending symbol indication is "0000", the ending symbol is 0.

In the eighth alternative implementation, the number of total scheduled slots is also indicated.

Figure 7:
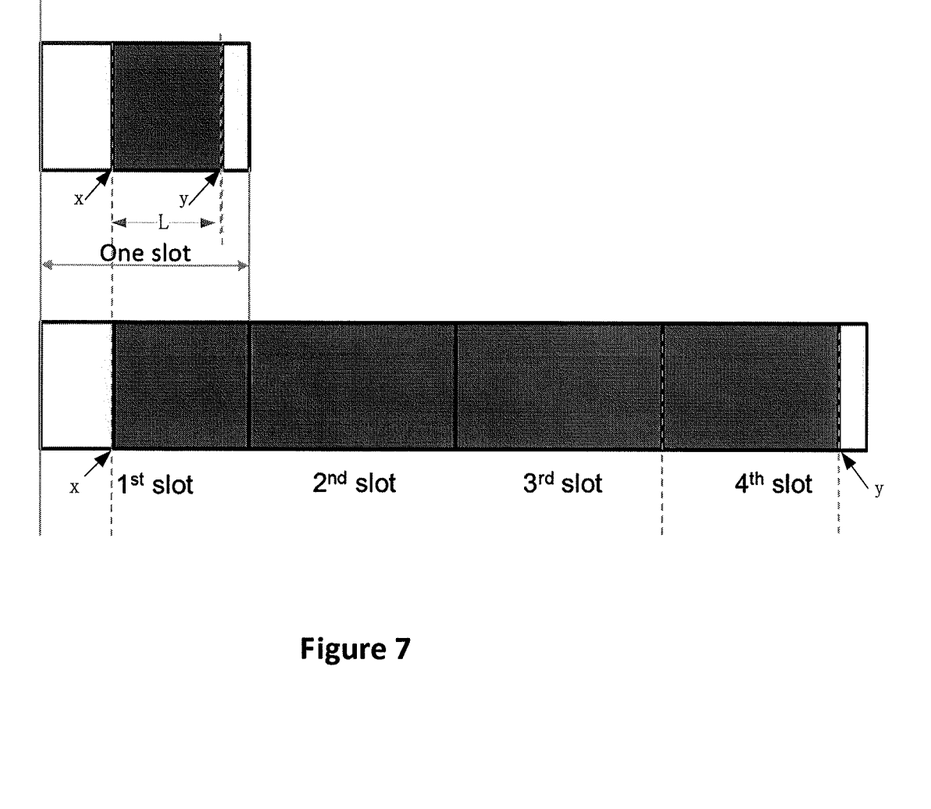
FIG. 7 is a schematic diagram illustrating a PUSCH mapping type B indication and a PUSCH mapping type C indication.

In a ninth alternative implementation of the first embodiment, time domain resource assignment in UL grant is used to determine the starting symbol of the first slot and the ending symbol of the last slot. In time domain resource assignment field a starting symbol index (denoted as x) and a duration (denoted as L) are indicated. For multi-slot scheduling, in one variable implementation, the indicated starting symbol index is the starting symbol index in the first scheduled slot and the indicated duration is the duration in the last scheduled slot. Since the last scheduled slot starts from Symbol 0, the ending symbol index in the last scheduled slot is equal to (L−1). For multi-slot scheduling, in another variable implementation, the indicated starting symbol index is the starting symbol index in the first scheduled slot and the indicated duration is used to derive the ending symbol index in the last scheduled slot. In detail, the ending symbol (denoted as y) in the last scheduled slot is calculated by an equation y=x+L−1. FIG. 7 shows a PUSCH mapping type B indication and a PUSCH mapping type C indication. The type B indicates one slot, in which x is the starting symbol and y is the ending symbol. In the type C, the starting symbol (x) may be interpreted as the starting symbol in the first slot. In addition, the ending symbol (y) may be interpreted as the ending symbol in the last slot. Here, full slot assignment is assumed for the middle slots (the second and third slots in FIG. 7).

In the ninth alternative implementation of the first embodiment, the number of scheduled slots or the number of full slots in the middle (referred to as the middle slots) is indicated in the UL grant. It is obvious that the number of middle slots equals the number of scheduled slots minus 2. In consideration that the minimum number of the scheduled slots is 2, the minimum number of middle slots is zero.

In a tenth alternative implementation of the first embodiment, current time domain resource allocation in UL grant is applied for the first slot and the full slot assignment is assumed for the second to last slots of the multiple slots. In the tenth alternative implementation, to satisfy the time-contiguous domain resource allocation, the ending symbol of the first slot has to be set to the ending symbol of the first slot, i.e., symbol 13. The number of scheduled slots needs to be indicated in the UL grant.

In an eleventh alternative implementation of the first embodiment, a series of time domain resource allocation patterns are predefined by RRC signaling. The field of time domain resource assignment in UL grant is used to indicate a certain time domain resource allocation pattern to UE.

For example, the PUSCH time domain resource allocation in RRC configuration for PUSCH mapping type C may be defined as below:
PUSCH-TimeDomainResourceAllocation ::=SEQUENCE {
k2 INTEGER(0..32) OPTIONAL, -- Need S
mappingType ENUMERATED {typeA, typeB, typeC},
startSymbolAndLength INTEGER (0..X)
}

In the above definition, X equals 127 for type A or type B. For type C, X equals ceil $$\left(\log_2\left(\frac{(N \times 14 + 1) \times N \times 14)}{2}\right)\right)$$

so as to support up to N full slots or 14*N contiguous symbols. For example, if N=4, then 11 bits are needed to indicate the time domain resource allocation from 1 symbol to 56 contiguous symbols. Alternatively, to reduce the signaling overhead and exclude the potential resource allocation with smaller than 14 symbols, X equals ceil $$\left(\log_2\left(\frac{((N-1) \times 14 + 1) \times (N-1) \times 14)}{2}\right)\right)$$

for type C so as to support up to N full slots or 14*N contiguous symbols. For example, if N=4, then 9 bits are needed to indicate the time domain resource allocation from 1 symbol to 42 contiguous symbols plus 14 symbols (i.e. from 15 contiguous symbols to 56 contiguous symbols).

In all of the varieties of the first embodiment, the number of the maximum slots that can be scheduled by a single UL grant is set to N, e.g. 4, in FIG. 6. In this sense, we assume that the number of the minimum slots that can be scheduled by a single UL grant is 1. Therefore, in the condition that 4 is the maximum number, the field size of the number of total scheduled slots equals ceil(log$_2$(the maximum number of slots))=ceil(log$_2$ 4)=2.

However, if the number of the total scheduled slots equals 1, the time domain resource allocated in 1 slot is definitely contiguous. Therefore, it is preferable to distinguish, by different UL grants, a multi-slot scheduling in which the number of the scheduled slots is larger than 2 and a single slot scheduling in which the number of the scheduled slots is set to 1. The multi-slot scheduling covers 2 to N slots, where N is RRC configured maximum number of slots scheduled by a single UL grant. In this condition, the number of required bits for indicating the number of scheduled slots is equal to ceil(log$_2$(N−2+1))=ceil(log$_2$(N−1)). For example, when N is set to 5, 2 bits can be used to indicate 2, 3, 4 or 5 scheduled slots.

On the other hand, if one UL grant has to be used for scheduling 1 to N slots, the minimum number of scheduled slots would be 1. In this condition, the number of required bits for indicating the number of scheduled slots is equal to ceil(log$_2$(N−1+1))=ceil(log$_2$N). For example, when N is set to 4, 2 bits can be used to indicate 1, 2, 3 or 4 scheduled slots. For another example, when N is set 5, 3 bits are needed to indicate 1, 2, 3, 4 or 5 scheduled slots.

In the first embodiment, the number of scheduled slots is indicated in the UL grant. As an alternative, the number of scheduled middle slots may be indicated in the UL grant. Due to the requirement of time-contiguous domain allocation, only the first slot and the final slot may be a partial slot, which means the starting symbol in the first slot is after symbol 0 or the ending symbol in the final slot is before symbol 13. On the other hand, all of the middle slots that are between the first slot and the final slot have to be full, which means that the starting symbol in each middle slot is always symbol 0 and the ending symbol of each middle slot is always symbol 13. So, if the UL grant is used for scheduling minimum 2 slots, then there is no ambiguity for UE to determine the time domain resource allocation when the number of scheduled middle slots is indicated. In this way, the total number of actually scheduled slots can be minimum 2 slots and maximum N slots. The number of required bits for indicating the number of scheduled middle slots is equal to ceil(log$_2$(N−2+1))=ceil(log$_2$(N−1)). For example, when N is configured to 5, 2 bits can be used to indicate 0, 1, 2 or 3 scheduled middle slots. Correspondingly, the total number of scheduled slots can be 2, 3, 4 or 5.

In the first embodiment, a new PUSCH mapping type C is introduced to indicate time-contiguous resource allocation for multiple slots. According to a second embodiment, the existing PUSCH mapping type A and type B are used in combination to indicate time-contiguous domain resource allocation for multiple slots.

The time-contiguous resource allocation for multi-slot transmission includes four cases: (1) all the slots are full slots; (2) the first slot is a partial slot and all the remaining slots are full slots; (3) the first to the last second slots are full slots and the last slot is a partial slot; (4) the first slot and the last slot are partial slots and all the middle slots are full slots. A full slot means that the starting symbol is symbol 0 and the ending symbol is symbol 13. A partial slot includes three cases: in a first case, the starting symbol is after symbol 0 and the ending symbol is Symbol 13; in a second case, the starting symbol is Symbol 0 and the ending symbol is before Symbol 13; in a third case, the starting symbol is after Symbol 0 and the ending symbol is before symbol 13.

In the first case, all the slots can be scheduled as PUSCH mapping type A since all the slots start from symbol 0 and occupy 14 symbols. Alternatively, all the slots may be scheduled as PUSCH mapping type B since PUSCH mapping type B may start from Symbol 0 and end at any symbol (including Symbol 13) within one slot.

In the second case, the first slot should be scheduled as PUSCH mapping type B since it doesn't start from symbol 0 and all the other slots are full slots and can be scheduled as PUSCH mapping type A since all the other slots start from symbol 0 and occupy 14 symbols. Alternatively, all the other slots may be scheduled as PUSCH mapping type B since PUSCH mapping type B may start from Symbol 0 and end at any symbol (including Symbol 13) within one slot.

In the third case, the last slot may be scheduled as PUSCH mapping type A if the last slot occupies at least 4 symbols or scheduled as PUSCH mapping type B. All the other slots are full slots and may be scheduled as PUSCH mapping type A or PUSCH mapping type B.

In the fourth case, the last slot may be scheduled as PUSCH mapping type A if the last slot occupies at least 4 symbols or scheduled as PUSCH mapping type B. The first slot should be scheduled as PUSCH mapping type B since it doesn't start from symbol 0. All the middle slots are full slots and may be scheduled as PUSCH mapping type A or PUSCH mapping type B.

As can be seen from the analysis of the four cases, PUSCH mapping type A and/or PUSCH mapping type B may be used individually or in combination to schedule a time-contiguous resource allocation for multi-slot transmission. There are various varieties in the second embodiment.

In a first alternative implementation, separate mapping type may be specified for the first slot, all the middle slots, and the last slot.

In a second alternative implementation, separate mapping type may be specified for the first slot and the last slot. All the middle slots may be fixed to mapping type A or type B.

In a third alternative implementation, separate mapping type may be specified for the middle slots and the last slot. The first slot may use mapping type A if it starts from symbol 0 and use mapping type B if it starts from other symbols than symbol 0.

In a fourth alternative implementation, separate mapping type may be specified for the first slot and the middle slots. The last slot may use mapping type A if the last slot occupies at least 4 symbols and use mapping type B if the last slot occupies 1, 2 or 3 symbols.

In a fifth alternative implementation, mapping type may be specified only for the last slot. The first slot uses mapping type A if it starts from symbol 0 and use mapping type B if it starts from any of symbols 1 to 12. All the middle slots may be fixed to mapping type A or type B.

In a sixth alternative implementation, the first slot may use mapping type A if it starts from symbol 0 and use mapping type B if it starts from any of symbols 1 to 12. All the middle slots may be fixed to mapping type A or type B. The last slot may use mapping type A if the last slot occupies at least 4 symbols and use mapping type B if the last slot occupies 1, 2 or 3 symbols.

Figure 8:
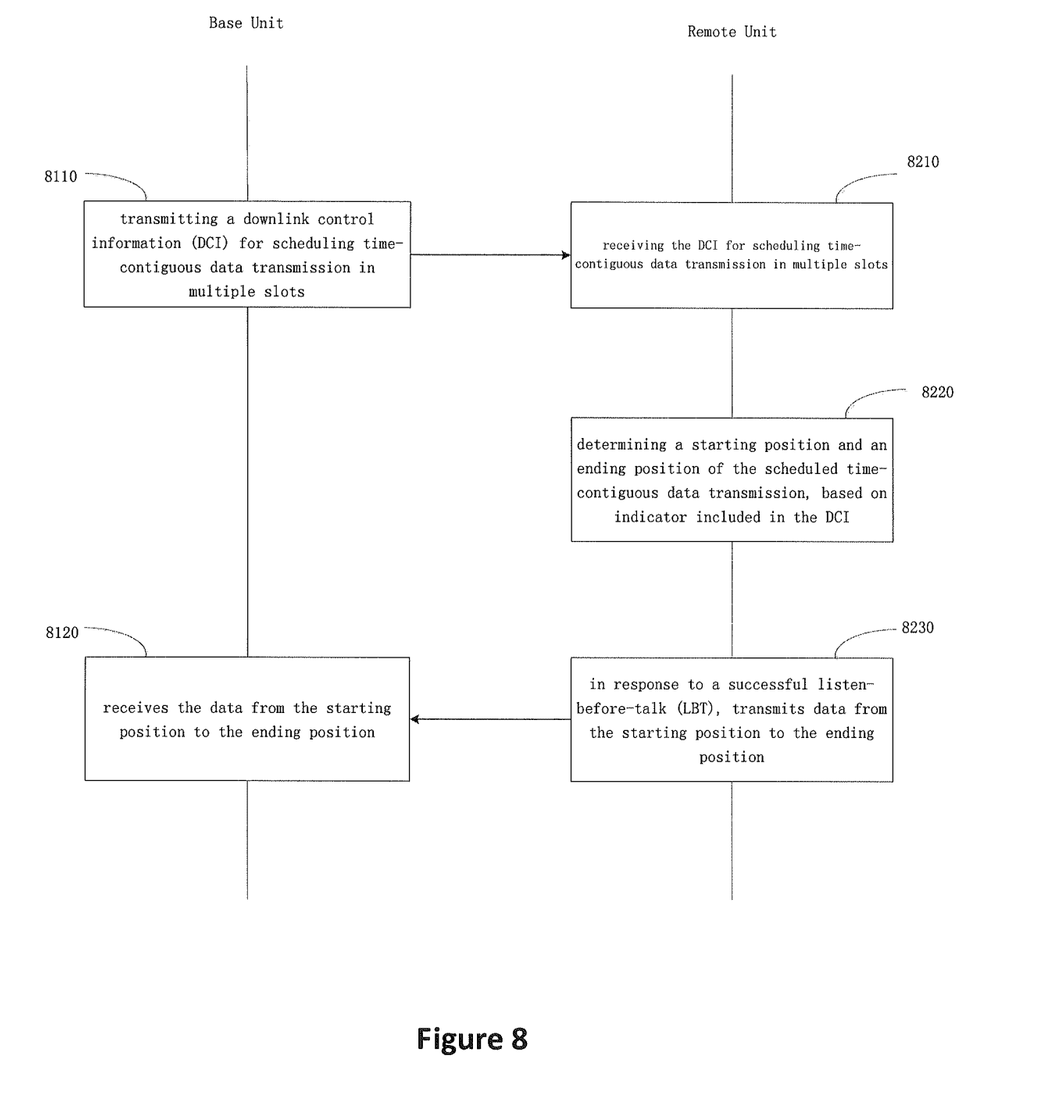
FIG. 8 is a flow chart diagram illustrating a method for multi-slot scheduling on unlicensed spectrum.

FIG. 8 is a flow chart diagram illustrating a method for multi-slot scheduling on unlicensed spectrum.

In step 8110, the base unit transmits a downlink control information (DCI) for scheduling time-contiguous data transmission in multiple slots to a remote unit, wherein the DCI includes an indicator indicating time domain resource allocation in the multiple slots.

In step 8210, the remote unit receives the DCI for scheduling time-contiguous data transmission in multiple slots.

In step 8220, the remote unit determines a starting position and an ending position of the scheduled time-contiguous data transmission, based on the indicator included in the DCI.

In step 8230, the remote unit, in response to a successful listen before talk (LBT), transmits data from the determined starting position to the determined ending position.

In step 8120, the base unit receives the data from the starting position to the ending position.

Embodiments may be practiced in other specific forms. The described embodiments are to be considered in all respects to be only illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a user equipment (UE), the method comprising:
   receiving a downlink control information (DCI) for scheduling time-contiguous data transmission in multiple slots, wherein the downlink control information includes an indicator indicating the time domain resource allocation in the multiple slots;
   determining, based on the indicator, a starting position and a length of the scheduled time-contiguous data transmission, wherein:
      the indicator:
         explicitly indicates three of: a starting symbol, a starting slot, an ending symbol, an ending slot, and a length of the scheduled time-contiguous data transmission in a first slot of the multiple slots; and
         implicitly indicates:
            the length of the scheduled time-contiguous data transmission in each of a number of slots of the multiple slots, the number of slots comprising slots between the starting slot and the ending slot; and
            at least one of the following not explicitly indicated by the indicator: the starting symbol, the starting slot, the ending symbol, and the ending slot; and
   transmitting, in response to a successful listen-before-talk, data from the determined starting position to the determined ending position.

2. The method of claim 1, wherein the indicator indicates the starting symbol in a first slot of the multiple slots.

3. The method of claim 2, wherein the starting symbol in the first slot is chosen from a set of possible starting symbols configured by radio resource control signaling, or from a set of possible starting symbols of physical uplink shared channel mapping type B, or is fixed to symbol 0.

4. The method of claim 1, wherein the indicator indicates the ending symbol of a last slot of the multiple slots.

5. The method of claim 4, wherein the ending symbol of the last slot is chosen from a set of possible ending symbols configured by radio resource control signaling, or from a set of possible ending symbols of physical uplink shared channel mapping type B.

6. The method of claim 1, wherein the indicator indicates the number of the multiple slots, the number of full slots, or a duration of the scheduled symbols in the multiple slots.

7. The method of claim 1, wherein the indicator indicates a starting symbol index in a first slot of the multiple slots and a difference between the starting symbol index and an ending symbol index of a last slot of the multiple slots.

8. The method of claim 1, wherein the indicator indicates a starting symbol index in a first slot of the multiple slots and a duration in a number of symbols in a last slot of the multiple slots.

9. The method of claim 1, wherein the indicator includes separate indications of physical uplink shared channel mapping types for a first slot, a last slot and middle slot(s) of the multiple slots.

10. The method of claim 9, wherein the physical uplink shared channel mapping types for the first slot, the last slot and the middle slot(s) of the multiple slots are implicitly determined.

11. A method performed by a base station, the method comprising:
   transmitting a downlink control information (DCI) to a remote unit for scheduling time-contiguous data transmission in multiple slots, wherein the downlink control information includes an indicator indicating time domain resource allocation in the multiple slots, wherein:
      the indicator:
         explicitly indicates three of: a starting symbol, a starting slot, an ending symbol, an ending slot, and a length of the scheduled time-contiguous data transmission in a first slot of the multiple slots; and
         implicitly indicates:
            the length of the scheduled time-contiguous data transmission in each of a number of slots of the multiple slots, the number of slots comprising slots between the starting slot and the ending slot; and
            at least one of the following not explicitly indicated by the indicator: the starting symbol, the starting slot, the ending symbol, and the ending slot; and
   receiving, from the remote unit subjected to a successful listen-before-talk, data from a starting position to an ending position determined from the indicated time domain resource allocation in the multiple slots.

12. The method of claim 11, wherein the indicator indicates the starting symbol in a first slot of the multiple slots.

13. The method of claim 12, wherein the starting symbol in the first slot is chosen from a set of possible starting symbols configured by radio resource control signaling, or from a set of possible starting symbols of physical uplink shared channel mapping type B, or is fixed to symbol 0.

14. The method of claim 11, wherein the indicator indicates the ending symbol of a last slot of the multiple slots.

15. The method of claim 14, wherein the ending symbol of the last slot is chosen from a set of possible ending symbols configured by radio resource control signaling, or from a set of possible ending symbols of physical uplink shared channel mapping type B.

16. The method of claim 11, wherein the indicator indicates the number of the multiple slots, the number of full slots, or a duration of the scheduled symbols in the multiple slots.

17. The method of claim 11, wherein the indicator indicates a starting symbol index in a first slot of the multiple slots and a difference between the starting symbol index and an ending symbol index of a last slot of the multiple slots.

18. The method of claim 11, wherein the indicator indicates a starting symbol index in a first slot of the multiple slots and a duration in a number of symbols in a last slot of the multiple slots.

19. A user equipment (UE), comprising:
at least one memory; and
at least one processor coupled with the at least one memory and configured to cause the UE to:
  receive a downlink control information (DCI) for scheduling time-contiguous data transmission in multiple slots, wherein the downlink control information includes an indicator indicating the time domain resource allocation in the multiple slots;
  based on the indicator, determine a starting position and a length of the scheduled time-contiguous data transmission, wherein:
    the indicator:
      explicitly indicates three of: a starting symbol, a starting slot, an ending symbol, an ending slot, and a length of the scheduled time-contiguous data transmission in a first slot of the multiple slots; and
      implicitly indicates:
        the length of the scheduled time-contiguous data transmission in each of a number of slots of the multiple slots, the number of slots comprising slots between the starting slot and the ending slot; and
        at least one of the following not explicitly indicated by the indicator: the starting symbol, the starting slot, the ending symbol, and the ending slot; and
  in response to a successful listen-before-talk, transmit data from the determined starting position to the determined ending position.

20. A base station, comprising:
at least one memory; and
at least one processor coupled with the at least one memory and configured to cause the base station to:
  transmit a downlink control information (DCI) to a remote unit for scheduling time-contiguous data transmission in multiple slots, wherein the downlink control information includes an indicator indicating time domain resource allocation in the multiple slots, wherein:
    the indicator:
      explicitly indicates three of: a starting symbol, a starting slot, an ending symbol, an ending slot, and a length of the scheduled time-contiguous data transmission in a first slot of the multiple slots; and
      implicitly indicates:
        the length of the scheduled time-contiguous data transmission in each of a number of slots of the multiple slots, the number of slots comprising slots between the starting slot and the ending slot; and
        at least one of the following not explicitly indicated by the indicator: the starting symbol, the starting slot, the ending symbol, and the ending slot; and
  receive, from the remote unit subjected to a successful listen-before-talk, data from a starting position to an ending position determined from the indicated time domain resource allocation in the multiple slots.

* * * * *